United States Patent [19]
Adam

[11] Patent Number: 6,120,233
[45] Date of Patent: *Sep. 19, 2000

[54] BULK SEED CARRIER

[76] Inventor: Gerald E. Adam, 2335 Salina Rd., Fairfield, Iowa 52556

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,731

[22] Filed: Jun. 3, 1997

[51] Int. Cl.[7] ............................................. B60P 1/40
[52] U.S. Cl. .................... 414/502; 414/800; 414/526; 414/523; 414/505; 222/105; 222/529
[58] Field of Search .................... 414/800, 812, 414/607, 608, 526, 523, 502, 503, 504, 505; 198/586, 588, 592, 589; 222/1, 105, 529

[56] References Cited

U.S. PATENT DOCUMENTS

| | | | |
|---|---|---|---|
| 2,490,241 | 12/1949 | Smith et al. | 414/526 X |
| 5,257,893 | 11/1993 | Sevits . | |
| 5,718,555 | 2/1998 | Swallheim | 414/526 X |
| 5,733,094 | 3/1998 | Bergkamp et al. | 414/526 |
| 5,785,481 | 7/1998 | Ockels | 414/526 |

FOREIGN PATENT DOCUMENTS

| | | | |
|---|---|---|---|
| 969901 | 7/1958 | Germany | 414/526 |

OTHER PUBLICATIONS

Sudenga Industries, Inc. "Bulk Seed Caddy" brochure, Jan. 1997, George, Iowa.

*Primary Examiner*—Frank E. Werner
*Attorney, Agent, or Firm*—Zarley, McKee, Thomte, Voorhees & Sease

[57] ABSTRACT

A bulk seed bag carrier and dispenser of the present invention is adapted to transport and dispense the contents of a plurality of bulk seed bags. The bag carrier and dispenser includes a plurality of hoppers having V-shaped bottoms which help to empty the contents of the bag as well as stabilize the bag within the hopper. A horizontal auger is disposed below the hoppers and empties into a discharge auger having a movable and telescoping spout. The hoppers of the bulk seed carrier are offset to one side to allow a fork lift to move closer to the hoppers. The bulk seed carrier is preferably controlled by a wireless remote control.

29 Claims, 6 Drawing Sheets

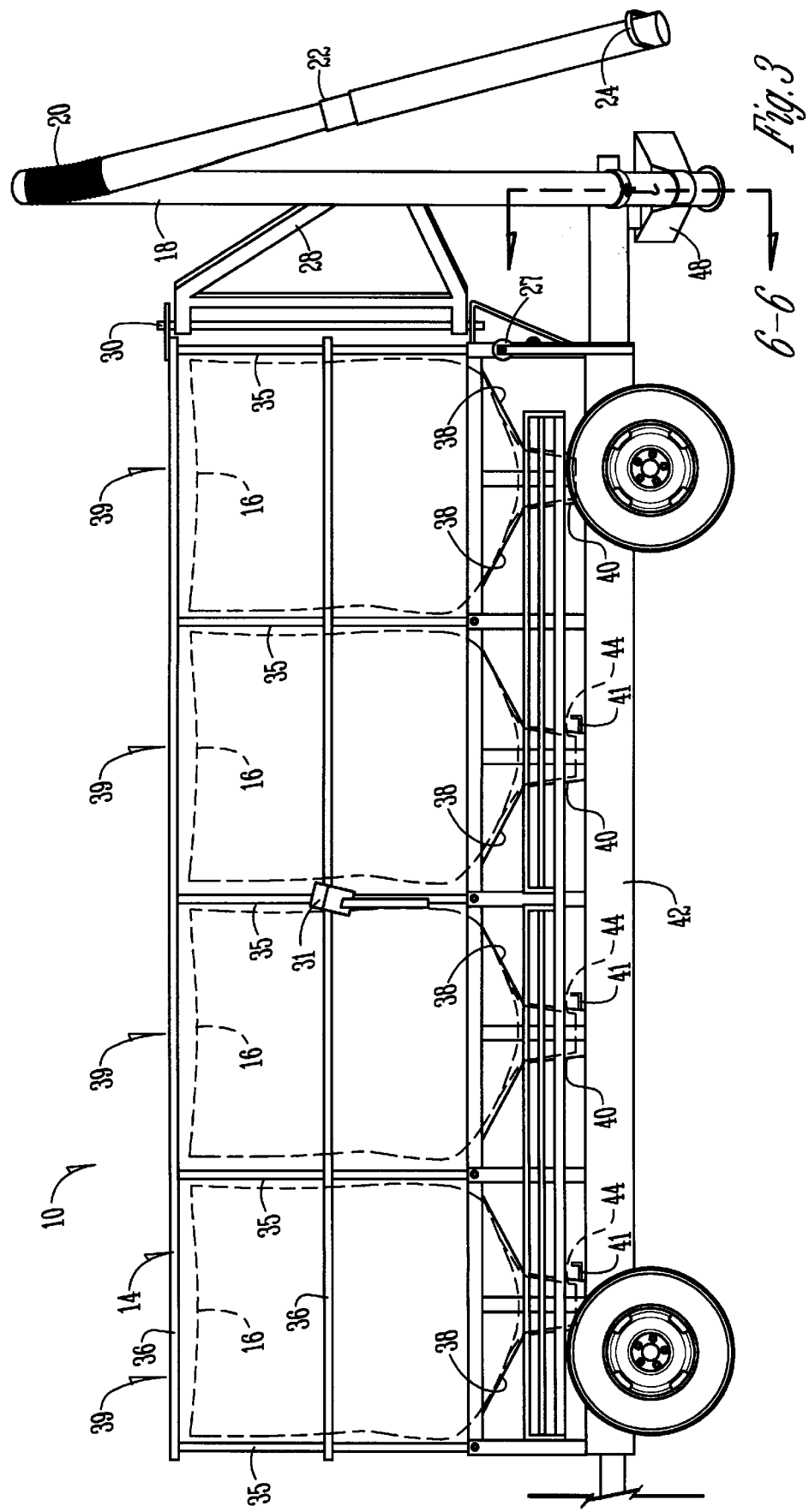

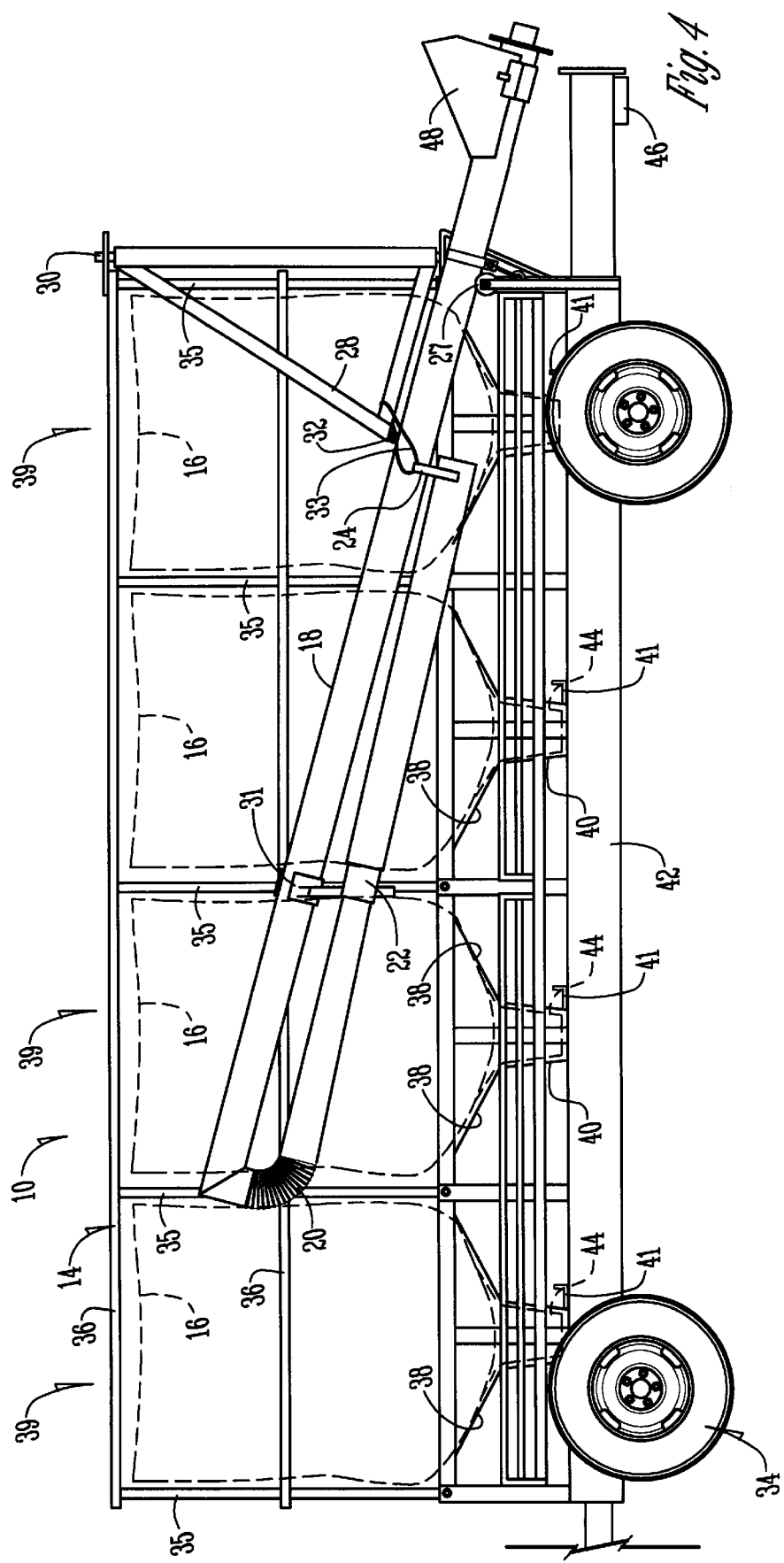

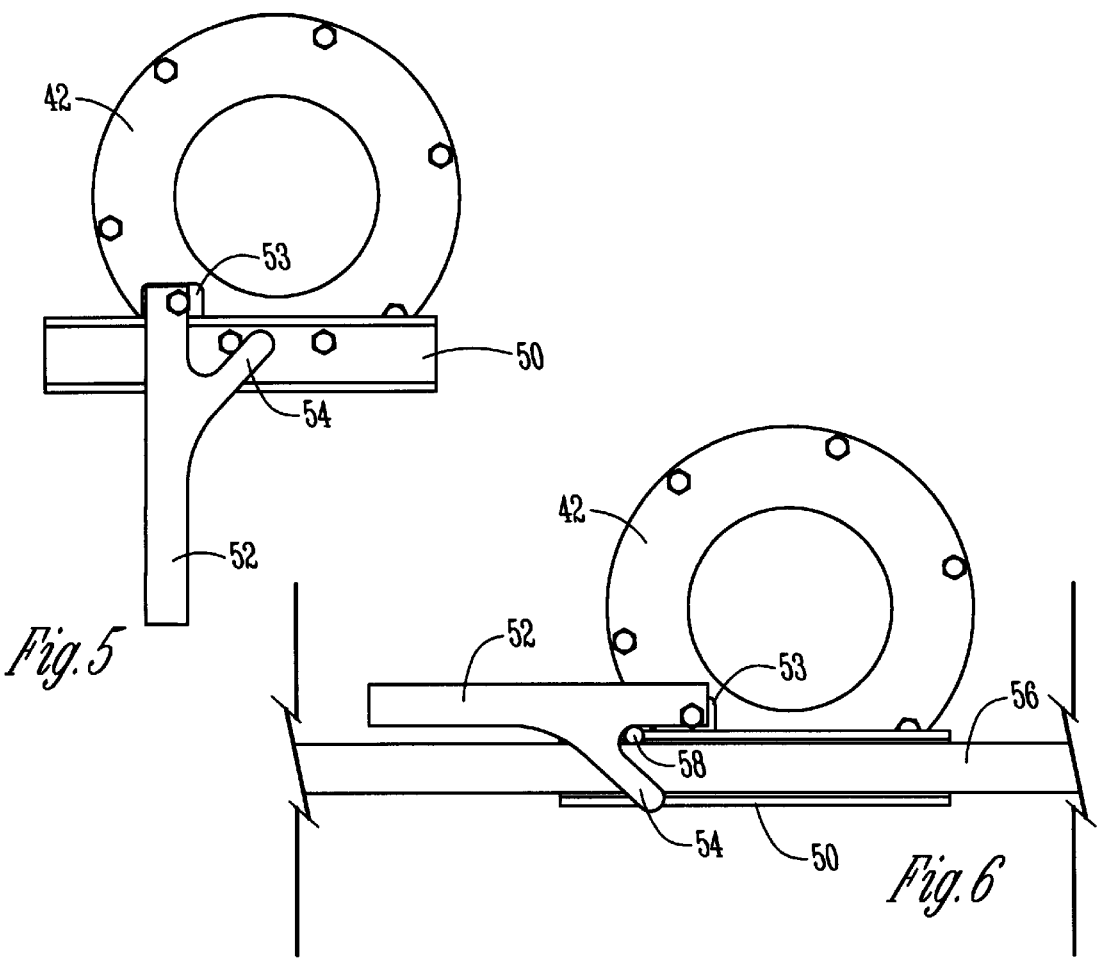
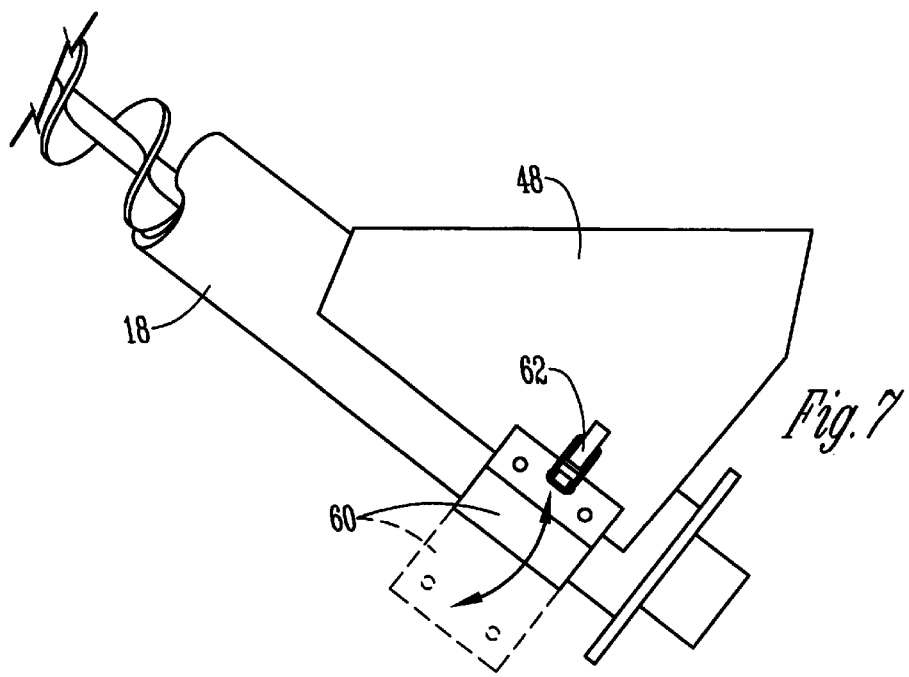

BULK SEED CARRIER

BACKGROUND OF THE INVENTION

1. Field of the Invention

The present invention relates to portable dispensers and carriers. More particularly, though not exclusively, the present invention relates to an apparatus and method for carrying and dispensing bulk seed.

2. Problems in the Art

Bulk seed bags weighing several thousand pounds are used in the agricultural industry to store and transport grain seed and other materials. The bulk bags can be loaded onto seed carriers with a forklift and transported to a location where the seed is needed. Devices exist in the prior art for carrying and dispensing bulk seed bags. One example of such a bulk seed bag carrier is disclosed in U.S. Pat. No. 5,257,893 issued to Sevits on Nov. 2, 1993 and is incorporated herein by reference. Prior art bulk seed carriers include a flat platform on which the bags are set. The platforms have openings which allow the spouts of the bags to extend downward into a chute. The chute flows to the bottom of a discharge auger which augers the contents of the bulk bags where the seed is needed.

Prior art seed carriers have several disadvantages. First, the bulk seed bags loaded on the flat platform can be unstable. Therefore, the seed carrier must have durable sides and other means for securing the bags in position. Another problem is encountered while loading bulk seed bags onto the carrier. If no pallet is used, and the bulk seed bags are lifted by lifting straps on top of the bag, the forklift often is not able to lift the bags high enough or move the bags onto the seed carrier platform far enough such that the opening of the bag lines up with the opening on the flat platform. Therefore, it is necessary to use pallets underneath the seed bags so that the pallet can be lifted partially onto the flat platform and then pushed the rest of the way onto the platform with a forklift. Since this operation requires a flat platform, the seed bags are often not completely emptied during use. In addition, special pallets must be used since an aperture must be provided in the center of the pallet for the spout of the bag to pass.

Another disadvantage with prior art bulk seed carriers is that the seed carrier or the item being filled with seed must be moved during the filling process. For example, when filling a multi-row planter, a few of the planter bins can be filled, but then the planter or seed carrier must be moved to fill the others. This is inconvenient and time consuming. Another disadvantage of prior art seed carriers results from the discharge augers being supported by ropes or cables and driven by winches. These items make using the prior art bulk seed carrier difficult and cumbersome. The ropes and cables can also present a safety hazard since a person could become caught or tangled in them. Another inconvenience found in the prior art bulk seed carriers is that the discharge auger of the seed carrier is activated and deactivated by a rope which is pulled to control a lever. This is also awkward and cumbersome to a user.

3. Features of the Invention

A general feature of the present invention is the provision of a method and apparatus for carrying bulk seed bags or other material which overcomes problems found in the prior art.

A further feature of the present invention is the provision of a method and apparatus for carrying bulk seed bags which uses a bulk seed bag carrier with an offset design for ease of operation.

A further feature of the present invention is the provision of a method and apparatus for carrying bulk seed bags which includes the use of V-shaped hoppers for stabilizing the bulk seed bags and for improving the removal of seed from the bags.

Further features, objects, and advantages of the present invention include:

A method and apparatus for carrying bulk seed bags which uses a discharge auger having a long telescoping discharge spout.

A method and apparatus for carrying bulk seed bags which uses a discharge auger which is balanced and pivoted about a dual pivot point for ease of operation.

A method and apparatus for carrying bulk seed bags which includes a novel latching system for latching the discharge auger into place.

A method and apparatus for carrying bulk seed bags which uses a wireless remote control to control the operation of the seed carrier.

A method and apparatus for carrying bulk seed bags which includes a discharge auger having a clean out door located near the bottom of the auger for removing unwanted seed from the auger.

A method and apparatus for carrying bulk seed bags in which the bags are never lifted over four feet off the ground.

A method and apparatus for carrying bulk seed bags in which the operator can safely open the bags without having to get under the bags.

A method and apparatus for carrying bulk seed bags which stabilizes the bags.

A method and apparatus for carrying bulk seed bags which has no exposed moving parts.

These as well as other objects, features, and advantages of the present invention will become apparent from the following specification and claims.

SUMMARY OF THE INVENTION

The apparatus and method of the present invention is used to dispense the contents of a bulk seed bag. The invention is comprised of at least one bulk seed bag hopper having a V-shaped bottom surface and being adapted to hold a bulk seed bag. The apparatus includes a discharge auger having an inlet end and a discharge spout. The inlet end is in operative communication with the V-shaped bottom surface of the hopper so that the contents of the bulk seed bag can be emptied and discharge via the discharge auger.

The present invention may optionally include a plurality of such bulk seed bag hoppers. In addition, the hoppers may be offset to one side for allowing easier access by a forklift.

BRIEF DESCRIPTION OF THE DRAWINGS

FIG. 3 is a side view of the present invention with the discharge auger in the in-use position.

FIG. 4 is a side view of the present invention with the discharge auger in the stored position.

FIG. 5 is a view of the latching mechanism of the present invention.

FIG. 6 is a view of the latching mechanism of the present invention in the latched position.

FIG. 7 is a partial view of the discharge auger showing the seed clean out door.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

Figure 1:
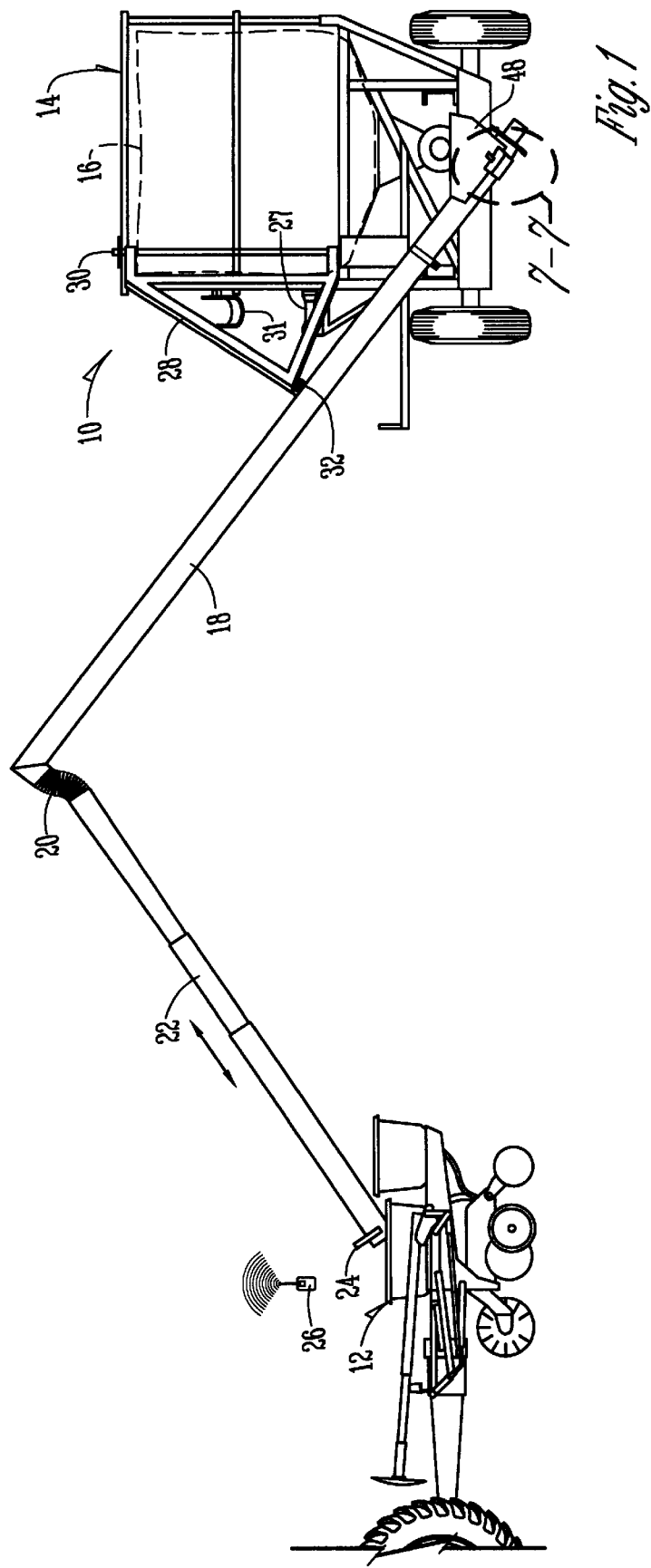
FIG. 1 is a rear view of the present invention being used to fill a planter with seed.

FIG. 1 shows a bulk seed carrier 10 of the present invention as it is being used to fill a planter 12 with seed. As shown, the seed carrier 10 includes a framework 14 which is designed to hold one or more bulk seed bags 16 (shown by dashed lines). The seed carrier 10 includes a discharge auger 18 having a flexible joint 20 which is attached to a long telescoping discharge spout 22 comprised of a plurality of cylindrical plastic members which are slidably coupled to each other. At the end of the spout 22 is a handle 24 which is used to manipulate the spout 22 to a desired position. By use of the flexible joint 20 and the telescoping spout 22, the bottom end of the spout 22 can be moved to any desired position within the reach of the spout 22.

FIG. 1 also shows a wireless remote control 26 which is held by the operator and is used to remotely activate and deactivate the discharge auger 18. The wireless remote 26 is a conventional wireless remote, similar to that used with keyless entry systems in vehicles.

The discharge auger 18 is coupled to the framework 14 in the following manner. A triangular shaped rotatable arm 28 is rotatable relative to the framework 14 about a pivot axis 30. The discharge auger 18 is pivotally coupled to the arm 28 about pivot point 32. The location of the pivot point 32 is carefully chosen so that the discharge auger 18 is balanced about the pivot point 32 so that the auger 18 can be pivoted by a user quite easily. As a result of the pivot point 32 and the rotatable arm 28, the discharge auger 18 can be rotated relative to the framework 14 of the seed carrier 10 and can also be pivoted at the same time. This allows a user to move the discharge auger 18 from an in-use position (shown in FIGS. 1 and 3) to a stowed transporting position (shown in FIGS. 2, 4, and 8).

Figure 2:
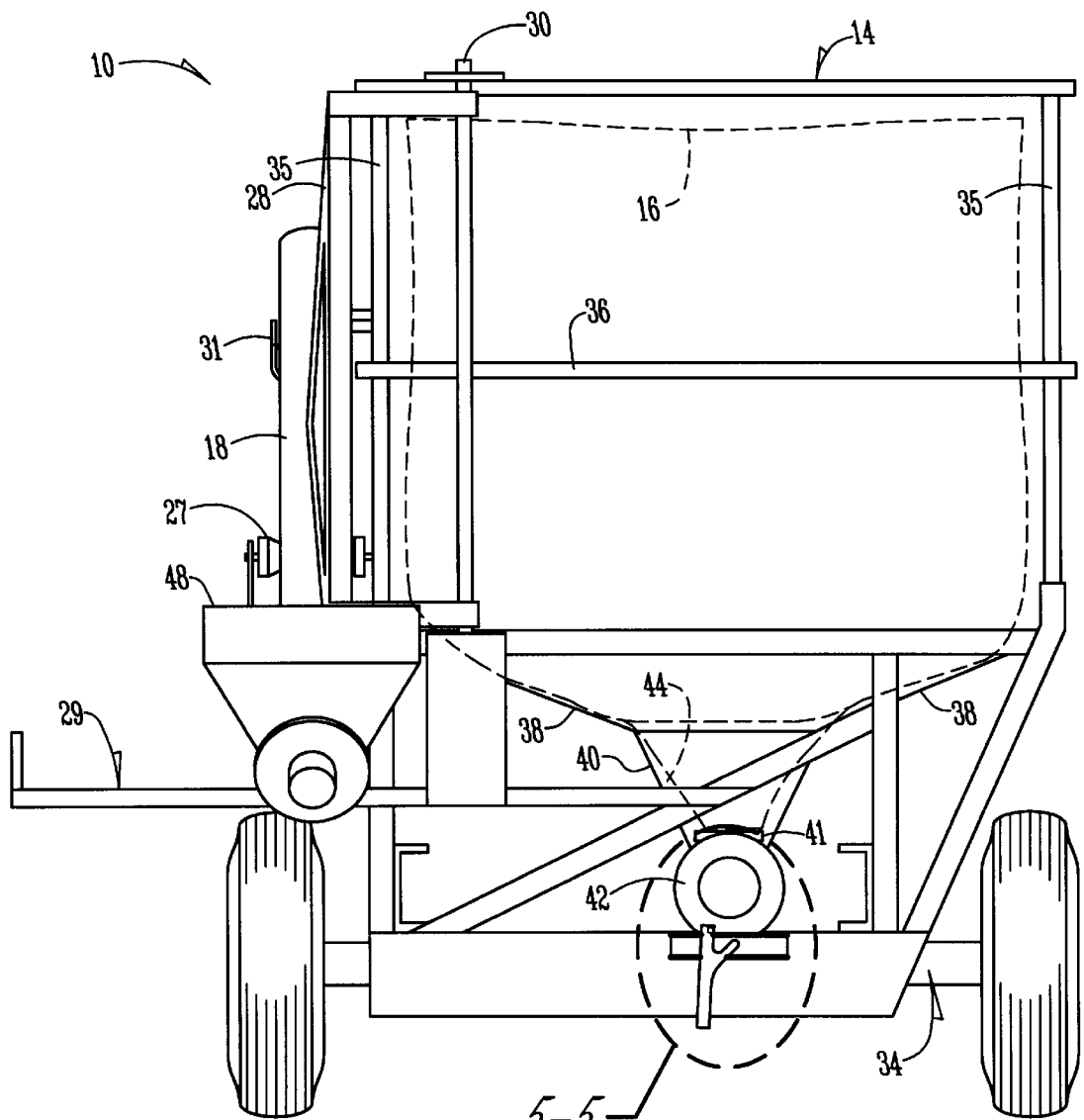
FIG. 2 is a rear view of the present invention showing the discharge auger in the stored position.

FIG. 2 is an enlarged rear view of the seed carrier 10 with the discharge auger 18 in the stowed position. As shown, the framework 14 is mounted to a running gear 34 which allows the seed carrier 10 to be portable. While the seed carrier 10 is preferably mounted to a running gear 34, the framework 14 could also be mounted to a flat bed trailer, a wagon, a truck, or to any other surface. One important aspect of the present invention is the offset design shown best in FIG. 2. As shown, the framework 14 is offset to the right relative to the running gear 34. This offset design has the advantage of allowing a forklift (not shown) to more effectively and easily load seed bag 16 onto the seed carrier 10 (from the right side in FIG. 2) without interference from the wagon's tires.

On the opposite side of the seed carrier 10 is a platform 29 which allows the operator to carry small bags of seed, seed treatment, or other items needed at the planter, for example.

FIGS. 3 and 4 are side views of the bulk seed carrier 10. FIG. 3 shows the discharge auger 18 in the in-use position while FIG. 4 shows the discharge auger 18 in the stowed transport position. In the stowed position, the discharge auger 18 rests in the U-shaped bracket 31 and the rubber roller 27. The rubber roller 27 is rotatable and is hinged relative to the framework 14 so that the discharge auger 18 can be moved from the stowed position to the in-use position. The rubber roller 27 lifts up on the auger 18 to put the weight of the auger 18 on the framework 14. In the stowed position the hinged roller 27 is locked into place. The spout 22 is held in place by securing a rubber strap 33 between the handle 24 and the arm 28.

As shown in FIGS. 2–4, the framework 14 is comprised of a number of vertical members 35 and a number of horizontal members 36. The vertical and horizontal members 35 and 36 are preferably comprised of square steel tubing welded together as shown forming a plurality of seed "bins". The framework 14 includes a number of downwardly sloping angled surfaces 38 to form a plurality of V-shaped hoppers 39. The angled surfaces 38 are disposed at the bottom of each hopper 39 and form the bottom surface of the hoppers 39 upon which each bulk seed bag 16 is placed. The V-shaped hoppers 39 allow the bags 16 to be held in a very stable manner. The V-shape of the surfaces 38 tend to hold the bags 16 in an upright position. Formed in the middle of each V-shaped hopper 39 is a chute 40 which terminates at a horizontal auger 42. At the bottom of the chute 40 is a slide gate 41 which can be opened or closed by the operator. When each bag 16 is loaded into one of the V-shaped hoppers 39, the opening or tongue 44 of each bag will be located in the chute 40. When the tongue 44 of the bag 16 is opened, the seed within the bag 16 will flow into the chute 40 and then into the horizontal auger 42 if the slide gate 41 is open.

The horizontal auger 42 includes a spout 46 through which the grain is discharged when the horizontal auger 42 is activated. When the discharge auger 18 of the seed carrier 10 is in the discharge position (FIGS. 1 and 3), the spout 46 is located above an auger hopper 48 such that grain passes from the spout 46 into the hopper 48 where it can be discharged via the discharge auger 18.

The discharge auger 18 is latched into the discharge position as shown in FIGS. 1 and 3 by a unique latching system. FIGS. 5 and 6 show this latching mechanism. The latching mechanism comprises a U-shaped channel 50 comprised of a U-shaped piece of iron bolted to the end of the discharge auger 42. The U-shaped channel 50 is oriented such that the open side faces rearward relative to the seed carrier 10. Coupled to the U-shaped channel is a latch mount 53. Rotatably coupled to the latch mount 53 is a latch lever 52 including an angled finger 54. The channel 50 is adapted to receive a square iron tube 56 which is welded to the top center portion of the auger hopper 48. To latch the discharge auger 18 into the discharge position, the discharge auger 18 is pivoted about pivot point 32 and rotated along with arm 28 until the hopper 48 is located below the spout 46. The member 56 is then placed within the channel 50 and the lever 52 is moved down to the position shown in FIG. 6. A pin 58 is welded to the square member 56 and extends rearwardly beyond the edge of the member 56. When latched in the position shown in FIG. 6, the channel 50 prevents the square member 56 from moving up, down, or forward. The finger 54 of the lever 52 prevent the square member 56 from moving backward, thereby locking the member 56 within the channel 50. The hopper 48 and square member 56 are prevented from sliding within the channel 50 by the pin 58 which is secured between the finger 54 and the latch mount 53. In this way, the discharge auger 18 can be quickly and easily secured in the discharge position.

When a user of the bulk seed carrier 10 wishes to put different varieties of seeds within each hopper 39 of the seed carrier 10, it is desired that the seed not be mixed. Therefore, when shifting hybrids, i.e., changing from one bag of seed to another, it is desirable to empty all of the seed from the horizontal auger 42 and the discharge auger 18. To empty the horizontal auger 42, the appropriate slide gate 41 is closed and the horizontal auger 42 operated until all of the seed has exited through the spout 46. To remove the unwanted seed from the discharge auger 18, a seed clean out door 60 can be opened by unsecuring the latch 62 (FIG. 7). The seed clean out door 60 is preferably comprised of a strong, flexible rubber strap mounted to the discharge auger 18 on the side opposite the latch 62 so that when the latch 62 is released, the rubber flap moves away from an opening formed in the bottom of the discharge auger 18. Once the unwanted seed is removed from the auger 18, the door 60 is closed and the latch 62 is secured.

Figure 8:
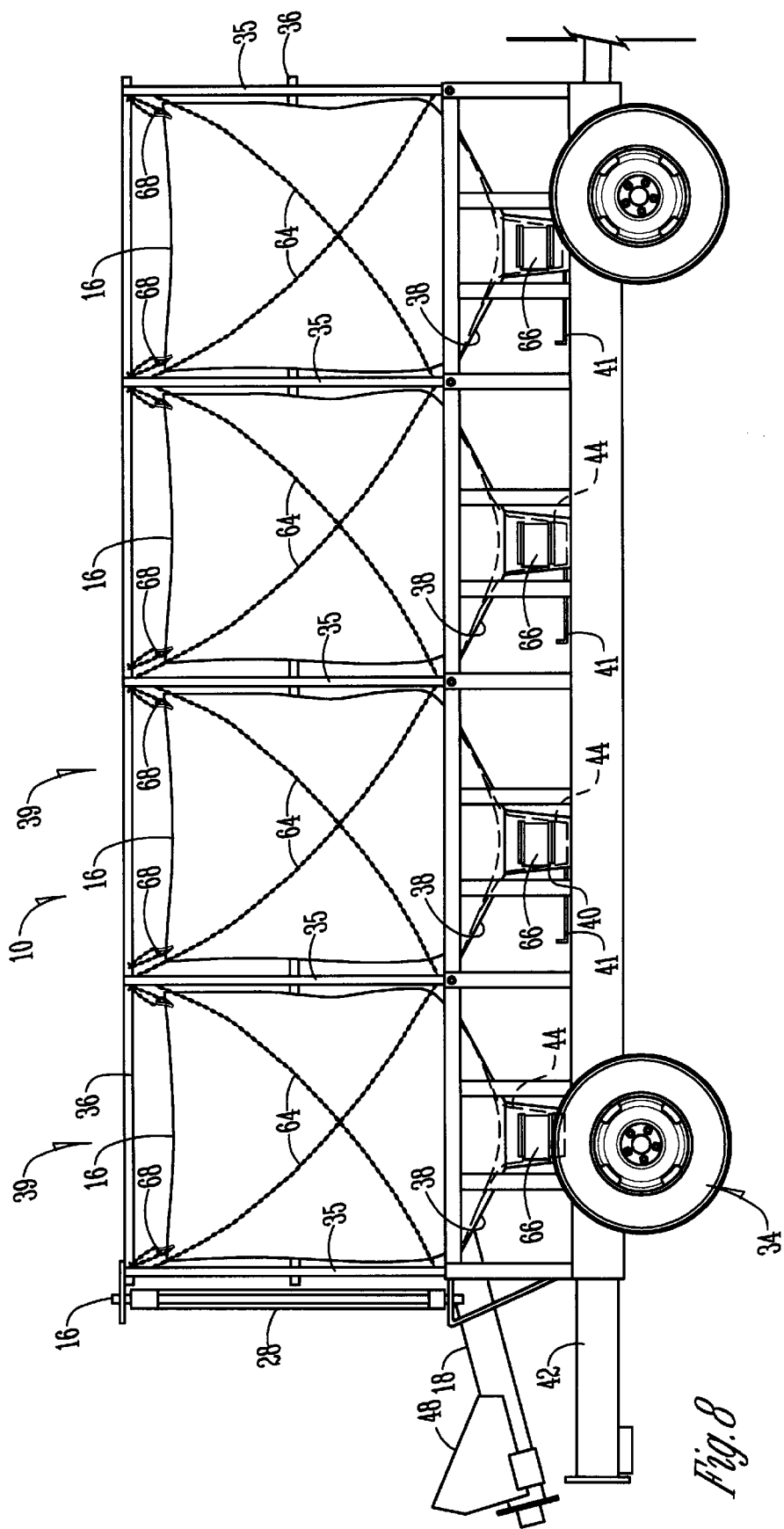
FIG. 8 is a side view viewing the present invention from the opposite side as FIG. 4.

FIG. 8 is a side view of the seed carrier 10 shown from the loading side of the seed carrier 10. As shown, there are no horizontal members 36 on the loading side so that the seed bags 16 can be loaded onto the seed carrier 10 by a forklift. To help hold the seed bags 16 into place, chains 64 are secured to the framework 14 as shown.

FIG. 8 also shows access doors 66 formed on each chute 40. The access doors 66 are slidably mounted to the chute 40 so that the user can open the doors 66 and access the tongue 44 of each bag 16. In this way, when the user wishes to use seed from any certain bag 16, the appropriate access door 66 can be slid open and the bag opened. The access doors 66 are designed such that the tongue 44 of the bag falls beyond the lowest point of the access doors 66 reducing the possibility of spillage of seed. The design of the access doors 66 also allows the rip cords of the bags 16 to be pinched in the door 66 to prevent the rip cord from being entangled during the operation of the seed carrier 10.

While the preferred embodiment has been described, many alternatives are possible. For example, the augers 18 and 42 could be equipped with steel core bristle flighting or cupped flighting for gentle handling of the seed. The spout 22 could come in various lengths and diameters, but preferably telescopes from seven to seventeen feet which allows the operator to fill a tall drill or twelve row planter from one position. The spout 22 also is free to rotate 360 degrees. The seed carrier 10 is shown with four hoppers 39 to carry four different hybrids or varieties of seeds, but could be comprised of more or less hoppers 39. The seed carrier 10 can be powered with hydraulic power from the towing vehicle, the planting unit tractor, or with an independent power unit mounted on the seed carrier 10.

The present invention operates as follows. The operation of the present invention will be described as it relates to loading seed into a planter such as planter 12. Before seed can be loaded into the planter 12, the seed bags 16 must be loaded onto the seed carrier 10. To accomplish this, each seed bag 16 is lifted by a fork lift via the loops 68 secured to the top of each bag 16. The forklift then lifts each bag 16 and drives up to the seed carrier 10 from the offset side (the right side of FIG. 2). When the bag 16 is generally centered within the V-shaped hopper 39, the bag 16 is lowered to the position shown in the Figures. Since the framework 14 is offset as shown, the fork lift is able to get closer to the hoppers 39 than with prior art seed carriers. When the bag 16 is lowered onto the angled surfaces 38, the tongue 44 of the bag 16 will extend downward through the chute 40. The bag 16 is secured to the seed carrier 10 by the chains 64 as shown in FIG. 8. Also, the loops 68 are secured to the upper portion of the framework 14 to hold the bag 16 upright as it is emptied. Additional seed bags 16 can be loaded in the same manner.

Before loading seed into the planter 12, the seed carrier 10 is transported near the planter 12. Since the discharge auger 18 will be in the stowed position as shown in FIG. 4, the auger 18 must be moved to the discharge position shown in FIGS. 1 and 3. To accomplish this, the user unlocks the hinged roller 27, lifts the discharge auger 18 out of the bracket 31, and rotates the arm 28 while pivoting the auger 18 about the pivot point 32 until the hopper 48 is located below the horizontal auger spout 46. At this point, the user inserts the square arm 56 into the channel 50 and pulls the lever 53 downward locking the discharge auger 18 into place (FIG. 6). The user may then disconnect the rubber strap 33 from the handle 24 (FIG. 4) which frees the auger spout 22. By using the handle 24, the user can move the end of the spout 22 to the first planter seed bin to be filled. The flexible joint 20 in combination with the telescoping spout 22 allows the opening of the spout 22 to be moved to any desired location within its reach.

Before loading the planter, the appropriate seed bag 16 must be opened. To do so, the user opens the appropriate access door 66 and pulls the rip cord on the appropriate tongue 44 of the bag 16. Next, the appropriate slide gate 41 is opened. This allows grain to flow through the chute 40 and into the horizontal auger 42.

The user then activates the wireless remote 26 which turns on the horizontal auger 42 and the discharge auger 18. As grain flows from the bag 16 it is transported by the horizontal auger 42 into the auger hopper 48 where it is augured through the spout 22 and into the planter 12. To stop the flow of seed, the operator uses the wireless remote 26 to stop the augers. The opening of the spout 22 can then be moved to the next planter seed bin.

When the operator wishes to change varieties or hybrids of seed, the remaining seed must first be removed from the horizontal auger 42 and the discharge auger 18 to avoid mixing the seeds. Once the first slide gate 41 is closed, the seed remaining in the horizontal auger 42 is emptied into the hopper 48 and the discharge auger 18. Any seed remaining in the discharge auger 18 can be removed by opening the seed clean out door 60 by unlatching the latch 62 and allowing the seed to fall to the ground. The door 60 is then closed and secured by the latch 62. The second variety of seed is then loaded into the planter 12 in the same manner as described above.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. An apparatus for dispensing the contents of a bulk seed bag having a bottom outlet comprising:

at least one bulk seed bag holder having a V-shaped bottom surface which holds, supports, and stabilizes a bulk seed bag when in position on the apparatus;

a seed transport mechanism positioned in a housing below the V-shaped bottom surface;

a chute extending from an opening in the V-shaped bottom surface to at or near the seed transport mechanism; and a discharge auger being mounted in an auger hopper and having an inlet end and a discharge spout, the inlet end being in operative communication with the seed transport mechanism such that the contents of the bulk seed bag can be emptied in the proximity of the V-shaped bottom surface, delivered to the discharge auger, and discharged via the discharge auger;

a mounting arm pivotally connected to a frame at a first side, and including a second side, generally opposite the first side, to which an intermediate portion of the discharge spout is pivotally attached, the mounting arm and discharge spout configured to allow movement of the inlet end of the discharge spout between a first position in the auger hopper and a second position outside the auger hopper;

a locking mechanism mounted between the frame and the discharge spout which allows the discharge spout to be locked into a dispensing position, so that the discharge spout can be pivoted between a locked dispensing position and a transport position while allowing pivoting and extension for dispensing without utilizing cables and winches;

a gate positioned between the opening and the seed transport mechanism and moveable between a position which allows movement of seed from the bulk seed bag outlet to the seed transport mechanism and a position which blocks such movement, so that dispensing of seed from the bulk seed bag can be selectively stopped.

2. The apparatus of claim 1, wherein the apparatus is mounted to a running gear having a center line, making the apparatus transportable.

3. The apparatus of claim 2 wherein the at least one bulk seed bag holder is offset relative to the center line of the running gear.

4. The apparatus of claim 3 wherein the offset allows a forklift to load a seed bag into the seed bag holder without interference by tires on the running gear.

5. The apparatus of claim 1 wherein the discharge spout is movably coupled relative to the discharge auger.

6. The apparatus of claim 5 wherein the discharge spout telescopes so that it is adjustable in length.

7. The apparatus of claim 1 wherein the discharge auger is supported by the arm.

8. The apparatus of claim 7 wherein the discharge auger is pivotally coupled to the arm such that the discharge auger can be rotated along with the arm and can pivot relative to the arm.

9. The apparatus of claim 8 wherein the discharge auger is movable between the dispensing position and the transport position.

10. The apparatus of claim 9 wherein said locking mechanism further comprising a latching mechanism for latching the discharge auger in the dispensing position.

11. The apparatus of claim 10 wherein the latching mechanism further comprises:
a U-shaped channel coupled to the apparatus;
an elongated member coupled to the inlet end of the discharge auger in an orientation generally parallel to the U-shaped channel; and
a lever rotatably coupled to the apparatus for holding the elongated member within the channel.

12. The apparatus of claim 11 further comprising:
a pin extending from the elongated member; and
a finger extending from the lever, wherein the finger engages the pin when the elongated member is latched within the channel.

13. The apparatus of claim 1 wherein at least one bulk seed bag holder is comprised of a plurality of bulk seed bag holders.

14. The apparatus of claim 13 wherein the seed transport mechanism comprises a second auger disposed generally horizontal below the V-shaped bottom surfaces of each bulk seed bag holder for transporting the contents of the bulk seed bags from the holders to the discharge auger.

15. The apparatus of claim 1 further comprising a wireless remote control for remotely controlling the operation of the apparatus.

16. The apparatus of claim 1 further comprising a door located proximate the inlet end of the discharge auger for removing material from the discharge auger.

17. The apparatus of claim 1 further comprising an access door formed in the V-shaped bottom surface of the bulk seed bag holder.

18. A method of dispensing the contents of bulk seed bags having a bottom comprising the steps of:
providing a framework which forms a plurality of seed bag holders having downwardly converging sloping bottom surfaces which hold, support and stabilize a seed bag when in position;
forming apertures in the bottom surfaces of the holders for allowing the contents of the bulk seed bags to flow through;
mounting a discharge auger to a pivoting arm attached to the framework, the discharge auger having an inlet end and an outlet spout;
providing a horizontal auger disposed below the plurality of seed bag holders for transporting the contents of the seed bags to the inlet end of the discharge auger;
loading the bulk seed bag onto each holder with an opening of each bag corresponding to the aperture of each respective holder;
moving the discharge auger on the pivoting arm to an operative position relative to the horizontal auger and latching the discharge auger in place;
moving the outlet spout of the discharge auger to a desired position in order to control where the contents of the bulk seed bags are to be dispensed;
opening one of the bulk seed bags and controlling the flow of seed by a moveable gate so that the contents of the one bag flow through the aperture and to the horizontal auger; and
activating the horizontal auger and the discharge auger to dispense the contents of the one bag.

19. The method of claim 18 further comprising the step of offsetting the plurality of seed bag holders relative to the center line of the frame work, and loading a bulk seed bag into each holder using a forklift, wherein the offset holders allow the forklift to more effectively load the seed bags.

20. The method of claim 18 further comprising the steps of:
providing a wireless remote control operatively connected to the horizontal auger and discharge auger; and
activating the horizontal auger and the discharge auger by using the wireless remote control.

21. A bulk seed carrier for holding and selectively dispensing the contents of bulk seed containers, comprising:
a frame having a longitudinal axis with a base;
the base including a supporting surface for at least one said bulk seed container and an opening through which seed from each bulk seed container can selectively pass into a chute, said supporting surface, being substantially the means of support for the seed container;
a seed transport mechanism generally horizontally positioned on or generally parallel to the longitudinal axis of the frame beneath the supporting surface and terminating in an auger hopper;

a discharge spout having an inlet end, a dispensing end and an intermediate portion;

a mounting arm pivotally connected to the frame at a first side, an including a second side, generally opposite the first side, to which the intermediate portion of the discharge spout is pivotally attached;

the mounting arm and discharge spout configured to allow movement of the inlet end of the discharge spout between a first position in the auger hopper and a second position outside the auger hopper;

a locking mechanism between the frame and the discharge spout which allows the discharge spout to be locked into a dispensing position;

so that the discharge spout can be pivoted between the locked dispensing position and a transport position while allowing pivoting and extension for dispensing without utilizing cables and winches.

22. The apparatus of claim 21 further comprising an access opening with a door on each chute for each seed container.

23. The apparatus of claim 22 further comprising the access opening positioned at a height generally at the position of release of seed from the seed container in the chute.

24. The apparatus of claim 21 further comprising a gate movable between a position which shuts off a pathway between the spout and a discharge auger and a position which opens the pathway.

25. The apparatus of claim 21 further comprising a clean out door at or near the inlet end of the discharge spout to allow access to and removal of any seed therein.

26. The apparatus of claim 21 further comprising a mounting structure on the frame for the seed container which is offset to one side of the longitudinal axis of the frame to allow easier loading of the seed container on the frame and easier access to the spout.

27. An apparatus for holding and dispensing the contents of a bulk seed container having an outlet comprising:

a frame having a longitudinal axis with a base;

the base including a supporting surface for the bulk seed container and an opening through which seed from a bulk seed container can pass into a chute, said supporting surface being substantially the means of support for the seed container;

a seed transport mechanism generally horizontally positioned on or generally parallel to the longitudinal axis of the frame beneath the supporting surface and terminating in a holder;

a discharge spout having an inlet end, a dispensing end and an intermediate portion connected to the frame;

a gate positioned between the opening and the seed transport mechanism and movable between a position which allows movement of seed from the bulk seed container outlet and the seed transport mechanism and a position which blocks such movement;

so that dispensing of seed from a bulk seed container can be selectively stopped and started.

28. The apparatus of claim 27 further comprising an access door positioned below the opening in the supporting surface, when opened providing access to the bulk seed container outlet.

29. The apparatus of claim 27 further comprising a clean out door in a discharge auger.

* * * * *